US008873358B2

(12) United States Patent
Saito et al.

(10) Patent No.: US 8,873,358 B2
(45) Date of Patent: Oct. 28, 2014

(54) SKEW DETECTION METHOD AND OPTICAL DISC DEVICE

(71) Applicant: Sony Corporation, Tokyo (JP)

(72) Inventors: Kimihiro Saito, Kanagawa (JP); Junya Shiraishi, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/011,269

(22) Filed: Aug. 27, 2013

(65) Prior Publication Data
US 2014/0064050 A1 Mar. 6, 2014

(30) Foreign Application Priority Data

Sep. 6, 2012 (JP) ................................. 2012-195734

(51) Int. Cl.
*G11B 11/00* (2006.01)
*G11B 7/00* (2006.01)
(52) U.S. Cl.
USPC ..................................... 369/53.14; 369/44.32
(58) Field of Classification Search
CPC ..... G11B 7/0956; G11B 7/0945; G11B 7/094
USPC .......... 369/44.32, 53.19, 44.28, 53.14, 53.15, 369/44.13
See application file for complete search history.

(56) References Cited

U.S. PATENT DOCUMENTS 5,870,372 A * 2/1999 Kuribayashi ................ 369/53.19
6,243,337 B1 * 6/2001 Miyanabe et al. ......... 369/44.32

FOREIGN PATENT DOCUMENTS

JP 2001-266385 9/2001

* cited by examiner

*Primary Examiner* — Nabil Hindi
(74) *Attorney, Agent, or Firm* — Sony Corporation

(57) ABSTRACT

There is provided a skew detection method including supplying reproduction signals, which are respectively reproduced approximately simultaneously from at least two tracks including a first adjacent track and a second adjacent track located on both sides of a main track, to first and second filters, causing a combining unit to combine output signals of the first and second filters with a reproduction signal which is reproduced from the main track approximately simultaneously with the first adjacent track and the second adjacent track so as to cancel crosstalk, causing a coefficient control unit to obtain an error with a target value of the output signal of the combining unit and control coefficients of the first and second filters so as to reduce the error, and detecting a skew of an optical disc from values of coefficients of predetermined taps of the first and second filters.

6 Claims, 16 Drawing Sheets

A

D

B

E

C

A

B

C

A

B

C

A

B

C

A

B

C

SKEW DETECTION METHOD AND OPTICAL DISC DEVICE

RELATED APPLICATIONS the present disclosure contains subject matter related to that disclosed in Japanese Priority Patent Application JP 2012-195734 filed in the Japan Office on Sep. 6,2012, the entire content of which is hereby incorporated by reference.

BACKGROUND

The present disclosure relates to a skew detection method and an optical disc device applied to, for example, an optical disc.

In the related art, an optical disc capable of recording information or reproducing the recorded information by using laser light is increasingly used. In order to increase a surface recording density, the beam spot diameter is narrowed by increasing the numerical aperture (NA) of an objective lens. However, the increase in numerical apertures leads to the increase in aberration. In particular, there is an increase in aberration which occurs at the time when the angle between an optical axis of an objective lens and a surface of an optical disc deviates from 90 degrees due to warpage or the like of the optical disc. Such aberration produces distortion of light spot on a surface of the disk and thus blurring is problematic. As a result, there is a problem in that crosstalk from adjacent tracks increases and thus the quality of reproduction signals deteriorates.

In this case, the distortion is in proportion to the distance over which light passes through the optical disc, i.e., the thickness of a cover layer, thus the thickness of the cover layer is reduced to 0.1 millimeters (mm) in the Blu-ray Disc (registered trademark). However, skew of the optical disc (also referred to as tilt or the like) occurs due to warpage or the like of the optical disc, and thus it is necessary to detect and correct skew of the optical disc. In an embodiment of the present disclosure, it is intended to correct skew in the radial direction of the disk (the direction transverse to a track).

As a method of detecting skew of an optical disc, there is a method that employs a skew sensor. However, the skew sensor makes the configuration more complex, and it is disadvantageous in terms of costs. A technique for using a reproduction signal of an optical disc without the skew sensor has been proposed (refer to Japanese Unexamined Patent Application Publication No. 2001-266385).

Japanese Unexamined Patent Application Publication No. 2001-266385 discloses a technique in which a main beam is irradiated onto the center of reproduction information tracks, two sub beams are irradiated onto a position deviated outward from the center of the reproduction information tracks by a predetermined distance, and reflected light of the two sub beams are received by a four-divided light receiving element. The output of the four-divided light receivingelement is calculated to obtain the amount of skew. A coma aberration is generated due to a tilt, and the reproduction signal values are influenced by both distortion of the reproduction signal itself and crosstalk from adjacent tracks. The distortion of the reproduction signal is due to the fact that a beam spot becomes an symmetrical shape with respect to the tilt direction and crosstalk from adjacent tracks.

SUMMARY

Japanese Unexamined Patent Application Publication No. 2001-266385 provides the detection of the amount of tilt by calculating the output signal of a photodetector, which is a disadvantage since it is difficult to set the gain of a reproduction signal.

In light of the foregoing, it is desirable to provide a skew detection method and optical disc device capable of avoiding the difficulty in setting the gain while eliminating the use of a skew sensor.

According to a first embodiment of the present disclosure, there is provided a skew detection method including supplying reproduction signals, which are respectively reproduced approximately simultaneously from at least two tracks including a first adjacent track and a second adjacent track located on both sides of a main track, to first and second filters, causing a combining unit to combine output signals of the first and second filters with a reproduction signal which is reproduced from the main track approximately simultaneously with the first adjacent track and the second adjacent track so as to cancel crosstalk, causing a coefficient control unit to obtain an error with a target value of the output signal of the combining unit and control coefficients of the first and second filters so as to reduce the error, and detecting a skew of an optical disc from values of coefficients of predetermined taps of the first and second filters.

According to an embodiment of the present disclosure, there is provided an optical disc device including a pickup that approximately simultaneously acquires reproduction signals respectively from a main track and at least two tracks including a first adjacent track and a second adjacent track located on both sides of the main track, a first filter to which a first reproduction signal reproduced from the first adjacent track is supplied, a second filter to which a second reproduction signal reproduced from the second adjacent track is supplied, a combining unit that combines output signals of the first and second filters with a reproduction signal of the main track so as to cancel crosstalk, a coefficient control unit that obtains an error with a target value of an output signal of the combining unit and controls coefficients of the first and second filters so as to reduce the error, a skew detection unit that detects a skew of an optical disc from values of coefficients of predetermined taps of the first and second filters, and a skew correction unit that corrects the detected skew.

In accordance with embodiments of the present disclosure, there is provided a skew detection method and optical disc device capable of eliminating the use of a skew sensor, reducing the difficulty of gain setting, and simplifying the processing.

DETAILED DESCRIPTION OF THE EMBODIMENT(S)

Figure 1:
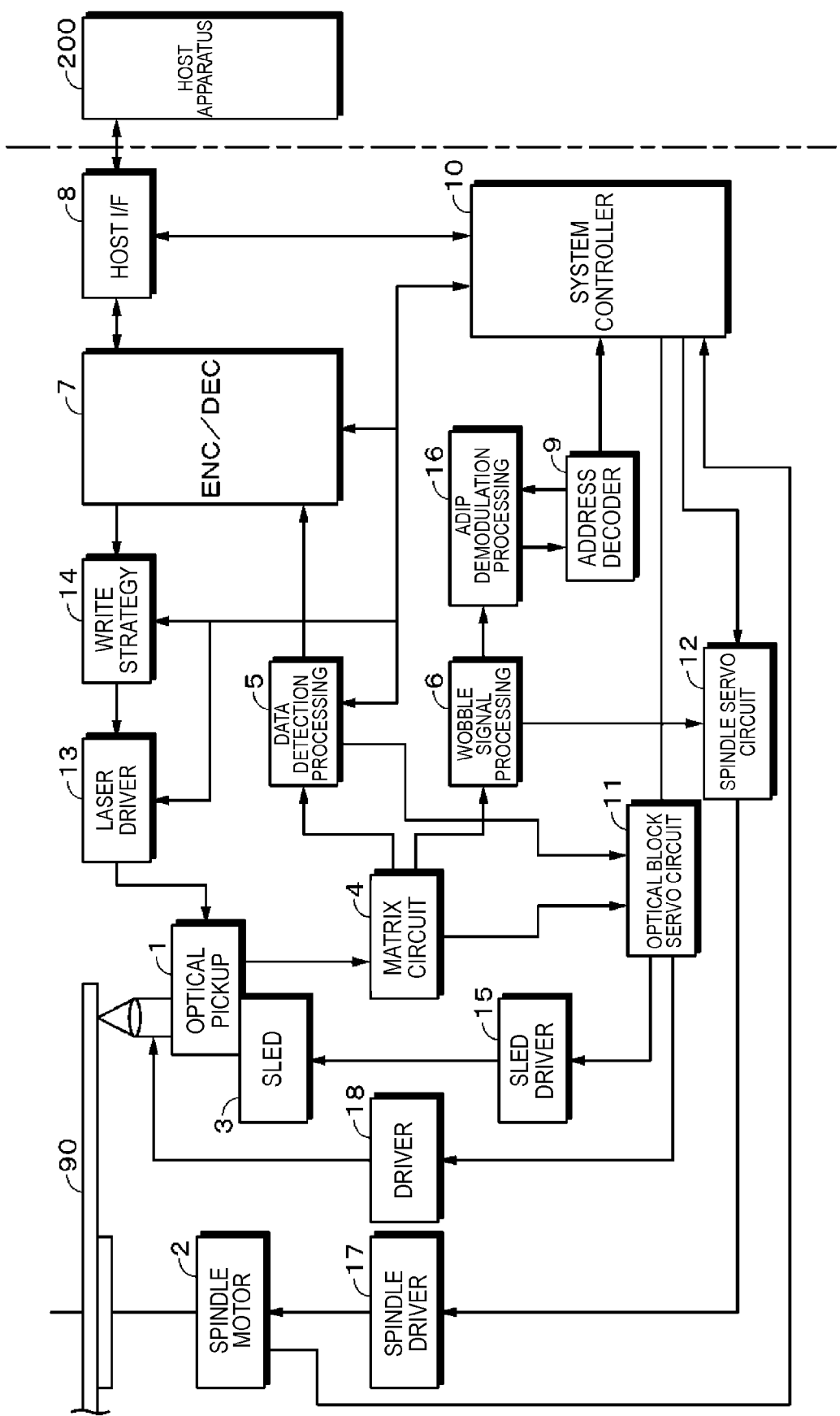
FIG. 1 is a block diagram illustrating a configuration of an optical disc device to which an embodiment of the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Embodiment of the Present Disclosure
2. Modified Embodiment
<1. Embodiment of Present Disclosure>
(Configuration of Optical Disc Device)

The configuration of an optical disc device according to an embodiment of the present disclosure will be described with reference to FIG. 1. The optical disc device according to an embodiment of the present disclosure is configured to record and reproduce data to and from, for example, a Blu-ray Disc (registered trademark). However, an embodiment of the present disclosure is applicable to an optical disc such as a read-only disc or recordable disc (write-once disk or rewritable disk) including compact discs (CDs), digital versatile discs (DVDs), next-generation discs or the like.

For example, in the case of a recordable Blu-ray Disc, a laser with a wavelength of 405 nm (so-called blue laser) and an objective lens with numerical aperture (NA) of 0.85 are used in combination with each other, and thus the recording and reproducing operations are performed for a phase-change mark or a pigment change mark. The recording and reproducing operations are performed at a track pitch of 0.32 μm and a linear density of 0.12 μm/bit with a 64 KB (kilobytes) data block used as one recording and reproducing unit (recording unit block: RUB). In the case of a read-only disk, data is recorded with embossed pits each having a depth of approximately $\lambda/4$.

The recording/reproducing unit, RUB, has a total of 498 frames that are generated, for an ECC (error-correcting code) block (cluster) having 156 symbols×496 frames, by adding one-frame link areas to the start and end of the ECC block.

The recordable disc has a meandering groove (wobbled groove) formed thereon. The wobbled groove forms recording/reproducing tracks. A wobbling of the groove includes so-called "ADIP (address in pregroove)" data. In other words, addresses on the disc can be obtained by detecting wobbling information of the groove.

In the case of a recordable disc, a recording mark is recorded using a phase change mark on the tracks formed by the wobbled groove. The phase change mark is recorded at a line density of 0.12 μm/bit (0.08 μm/ch bit) by using the RLL (run length limited) (1,7) PP (Parity preserve/Prohibit rmtr (repeated minimum transition runlength)) modulation method or the like. When a channel clock cycle is represented by "T", a mark length has a value ranging from 2T to 8T. In the case of the read-only disc, the groove is not formed. However, the read-only disc contains data modulated by similarly using the RLL (1,7) PP modulation method and recorded in an embossed pit string.

An optical disc 90 such as a Blu-ray Disc, when loaded onto the optical disc device, is rotatably driven at a constant linear velocity (CLU) or a constant angular velocity (CAV) by a spindle motor 2 during recording/reproduction. In addition, mark information recorded on a track of the optical disc 90 is read by an optical pickup 1 (optical head) during reproduction. When data is recorded on the optical disc 90, user data is recorded, as the phase change mark or the pigment change mark, on the track of the optical disc 90 by the optical pickup 1.

In addition, for example, physical information or the like of the disc is recorded, as management information exclusive for reproduction, by the embossed pits or wobbled groove on an inner circumferential area or the like of the optical disc 90. The recorded information is read by the optical pickup 1. The optical pickup 1 also reads ADIP information embedded in the wobbled form of the groove track on the disc 90.

Further, the detection of a skew and correction of the detected skew according to an embodiment of the present disclosure are not limited to a process when an optical disc is reproduced, but may also be performed during recording. In other words, if there is a skew during recording, a beam spot used for recording is distorted. In order to prevent this, before recording, a skew is detected using a signal which is previously recorded in a predetermined recording region of the optical disc, and then the skew is corrected during recording. Particularly, in a case of high density recording in which a track pitch is narrow, this skew correction during recording is preferably performed. Therefore, the following description of an embodiment of the present disclosure is applicable to both recording and reproduction on an optical disc.

The optical pickup 1 includes a laser diode which serves as a laser light source, a photodetector which detects the reflected light, an objective lens which is an output end of laser light, and an optical system which irradiates a disc recording surface with laser light through the objective lens and guides the reflected light from the disc to the photodetector. The objective lens is held within the optical pickup 1 so that the objective lens is movable in tracking and focus directions by a biaxial mechanism. Further, the optical pickup 1 is provided with a skew correction unit. The entire optical pickup 1 is movable in a disc radial direction by a sled mechanism 3. A driving current is supplied to the laser diode of the optical pickup 1 from a laser driver 13 and thus the laser diode generates laser light.

Reflected light from the disc 90 is detected by the photodetector, and is converted into an electric signal which is corresponded to an amount of received light to be provided to a matrix circuit 4. The matrix circuit 4 includes a currentvoltage conversion circuit, a matrix calculation/amplification circuit, and other circuits for processing currents output from a plurality of light receiving elements serving as a photodetector, and the matrix circuit 4 generates necessary signals through a matrix calculation process. For example, the matrix circuit 4 generates a reproduction information signal (RF signal) corresponding to reproduction data, a focus error signal for servo control, a tracking error signal, and the like. In addition, the matrix circuit 4 generates a signal related to the wobbling of the groove, that is, a push-pull signal as a signal for detecting the wobbling.

The reproduction information signal being output from the matrix circuit 4 is supplied to a data detection processing unit 5. The focus error signal and tracking error signal being output from the matrix circuit 4 are supplied to an optical block servo circuit 11. The push-pull signal being output from the matrix circuit 4 is supplied to a wobble signal processing circuit 6.

The data detection processing unit 5 performs a binarization process on the reproduction information signal. For example, the data detection processing unit 5 performs an A/D conversion process of an RF signal, a reproduction clock generation process by PLL, a partial response (PR) equalization process, a Viterbi decoding (maximum likelihood decoding), and other processes. A binary data string is obtained by executing a partial response maximum likelihood process (PRML detection method). A detailed description thereof will be described later. The data detection processing unit 5 supplies the binary data string which is serving as information read from the optical disc 90 to an encoding/decoding unit 7 in a subsequent stage.

The encoding/decoding unit 7 performs a demodulation process for data being reproduced during reproduction, and performs a modulation process for data being recorded during recording. That is, the encoding/decoding unit 7 performs data demodulation, de-interleaving, ECC decoding, address decoding, and the like during reproduction. The encoding/decoding unit 7 performs ECC encoding, interleaving, data modulation, and the like during recording.

During reproduction, the binary data string decoded in the data detection processing unit 5 is supplied to the encoding/decoding unit 7. In the encoding/decoding unit 7 performs the demodulation process for the binary data string to obtain the reproduction data from the optical disc 90. That is, for example, a run length limited code modulation such as RLL (1,7) PP modulation is performed such that a demodulation process and an ECC decoding process for performing error correction are performed for data recorded on the optical disc 90, thereby obtaining the reproduction data from the optical disc 90.

Data decoded to the reproduction data in the encoding/decoding unit 7 is transmitted to a host interface 8, and then is transmitted to a host apparatus 200 based on instructions of a system controller 10. The host apparatus 200 includes, for example, a computer apparatus, audio-visual (AV) system apparatus, and the like.

During recording/reproduction with respect to the optical disc 90, a process of the ADIP information is performed. In other words, the push-pull signal that is output as a signal related to the wobbling of the groove from the matrix circuit 4 is converted into digitized wobble data by the wobble signal processing circuit 6. The PLL processing generates a clock signal synchronized with the push-pull signal. An ADIP demodulation processing unit 16 performs a demodulation process on the wobble data to generate a data stream constituting an ADIP address and supplies the data stream to an address decoder 9. The address decoder 9 performs a decoding process on the supplied data to obtain an address value and supplies the address value to the system controller 10.

In the recording mode, the recording data transmitted from the host apparatus 200 is supplied to the encoding/decoding unit 7 through the host interface 8. In this case, the encoding/decoding unit 7 performs processing such as error correction code addition (ECC encoding), interleaving, and sub-code addition, as the encoding processing of the recording data. The run length limited code modulation such as RLL (1,7) PP method or the like is performed on the data having undergone these processes.

The recoding data processed by the encoding/decoding unit 7 is supplied to a write strategy unit 14. In the write strategy unit 14, waveform adjustment of the laser driving pulse is performed, as a recording compensation process, on characteristics of a recording layer, a laser light spot shape, a recording linear velocity, and the like. Next, the laser driving pulse is output to the laser driver 13.

The laser driver 13 makes a current flow into the laser diode within the optical pickup 1 based on the laser driving pulse having undergone the recording compensation process so that the optical pickup 1 emits laser light. This can form marks corresponding to the recording data on the optical disc 90.

The optical block servo circuit 11 generates the focus error signal from the matrix circuit 4 and generates various servo drive signals such as focus, tracking, and sled from the tracking error signal, thereby allowing execution of servo operations. That is, the optical block servo circuit 11 generates a focus drive signal and a tracking drive signal according to the focus error signal and the tracking error signal, respectively, and allows a driver 18 to drive a focus coil and tracking coil of a biaxial mechanism in the optical pickup 1. Thus, the optical pickup 1, the matrix circuit 4, the optical block servo circuit 11, the driver 18, and the biaxial mechanism form a tracking servo loop and a focus servo loop.

In addition, the optical block servo circuit 11 generates a skew servo signal from the skew correction signal and thus generates a signal for driving the skew correction unit provided in the optical pickup 1. The skew correction signal is supplied from the data detection processing unit 5 as described later. The skew correction unit is configured, for example, to tilt the entire optical pickup or the objective lens by using the actuator. Alternatively, a liquid crystal device having a pattern for correcting a coma aberration may be used.

In addition, the optical block servo circuit 11 allows the optical pickup 1 to execute a track jump operation by turning off the tracking servo loop and outputting a jump drive signal in response to a track jump command from the system controller 10. Further, the optical block servo circuit 11 generates a sled drive signal based on, for example, a sled error signal obtained as a low frequency component of the tracking error signal, access execution control from the system controller 10, or the like. The optical block servo circuit 11 drives the sled mechanism 3 by using the sled driver 15.

A spindle servo circuit 12 controls the spindle motor 2 to perform CLV rotation. The spindle servo circuit 12 generates a spindle error signal by obtaining the clock generated in the PLL process for the wobble signal as current rotation velocity information of the spindle motor 2, and comparing the current rotation velocity information with predetermined CLV reference velocity information. In addition, during reproduction of data, a reproduction clock signal generated by the PLL in the data signal processing circuit 5 serves as the current rotation velocity information of the spindle motor 2. Thus, the spindle error signal is generated by comparing the reproduction clock signal with the predetermined CLV reference velocity information. Further, the spindle servo circuit 12 outputs the spindle drive signal generated based on the spindle error signal, and it executes CLV rotation of the spindle motor 2 by using the spindle driver 17.

Moreover, the spindle servo circuit 12 generates the spindle drive signal in response to a spindle kick/brake control signal from the system controller 10 and controls the spindle driver 17 to execute operations such as start, stop, acceleration, and deceleration of the spindle motor 2.

The above described various operations in the servo system and the recording and reproduction system are controlled by the system controller 10 configured to include a microcomputer. The system controller 10 performs various processes in response to commands given from the host apparatus 200 through the host interface 8. For example, when a write command is issued from the host apparatus 200, the system controller 10 moves the optical pickup 1 to an address to be written. Then, the encoding/decoding unit 7 performs the above described encoding process on data (for example, video data, audio data, or the like) transmitted from the host apparatus 200. Then, the laser driver 13 is driven to emit a laser based on the encoded data for performing recording.

In addition, in a case where a read command for requesting the transfer of data recorded on the optical disc 90 is supplied from the host apparatus 200, the system controller 10 first performs seek operation control using a specified address as a target. That is, the system controller 10 issues a command to the optical block servo circuit 11, and causes the optical block servo circuit 11 to perform an access operation of the optical pickup 1 using the address specified by the seek command as the target. Then, the system controller 10 performs operation control necessary to transfer data in the indicated data section to the host apparatus 200. That is, the system controller 10 reads data from the disc 90, and causes the data detection processing unit 5 and the encoding/decoding unit 7 to perform a reproduction process on the data, thereby transmitting the requested data.

In addition, although the optical disc device connected to the host apparatus 200 has been described in the example of FIG. 1, the optical disc device may have a configuration that is not be connected to other apparatus. In this case, the optical disc device may be provided with an operation unit or a display unit, or its data input/output interface unit is different in configuration from that of FIG. 1. That is, the above configuration allows the recording or reproduction to be performed based on the user's operation, and it may be provided with a terminal used to input and output various types of data. It is obvious that various other examples of the configuration of the optical disc device are possible.

(Data Detection Processing Unit According to Embodiment)

The data detection processing unit 5 according to an embodiment is configured to cancel crosstalk by performing a digital filter process on signals of adjacent tracks and subtracting an output signal of the digital filter from a reproduction signal of a main track. In an embodiment of the present disclosure, a skew of the optical disc is detected from a value of tap coefficients of the digital filter.

(Estimation of Crosstalk Characteristics Using LSF)

In an embodiment, crosstalk characteristics are estimated using a line spread function (LSF). Here, a description will be made of a relationship between the LSF and a reproduction signal of the optical disc.

A reproduction signal from the optical disc 90 may be obtained by performing a pseudo-calculation in which values obtained by multiplying an intensity distribution (point spread function (PSF); two-dimensional distribution) of light spots collected by the objective lens of the optical pickup 1 by a distribution of mark reflectance Mark(x,y) (absence of a mark is indicated by 0, and presence of a mark is indicated by 1) are integrated. Here, x indicates a movement amount in the track direction.

$$I(x) = \int_{-\infty}^{+\infty}\int_{-\infty}^{+\infty} \mathrm{Mark}(x'-x, y')PSF(x', y')dx'dy' \quad (1)$$

The PSF is obtained by performing Fourier transform on the amplitude of light on the objective lens so as to obtain light amplitude (Amplitude Spread Function) on the optical disc and then taking intensity.

Figure 2:
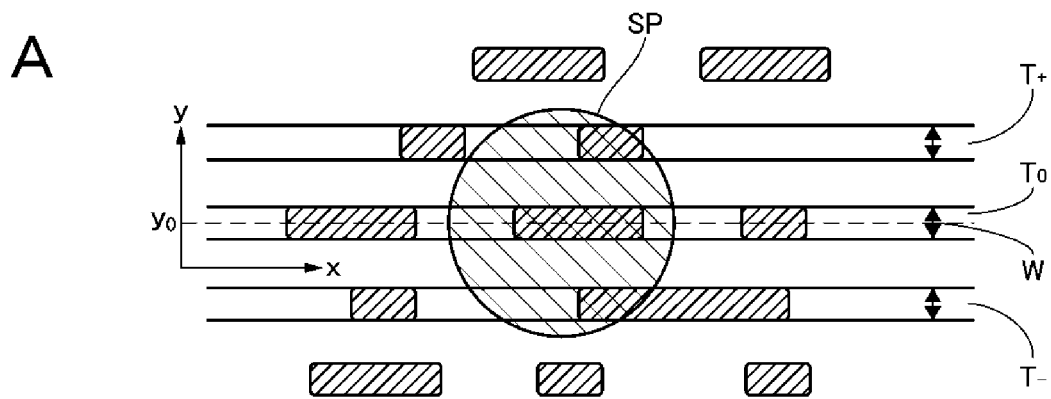
FIGS. 2A and 2B are schematic diagrams for explaining LSF and a mark pattern on an optical disc to which an embodiment of the present disclosure is applied.
Figure 2:
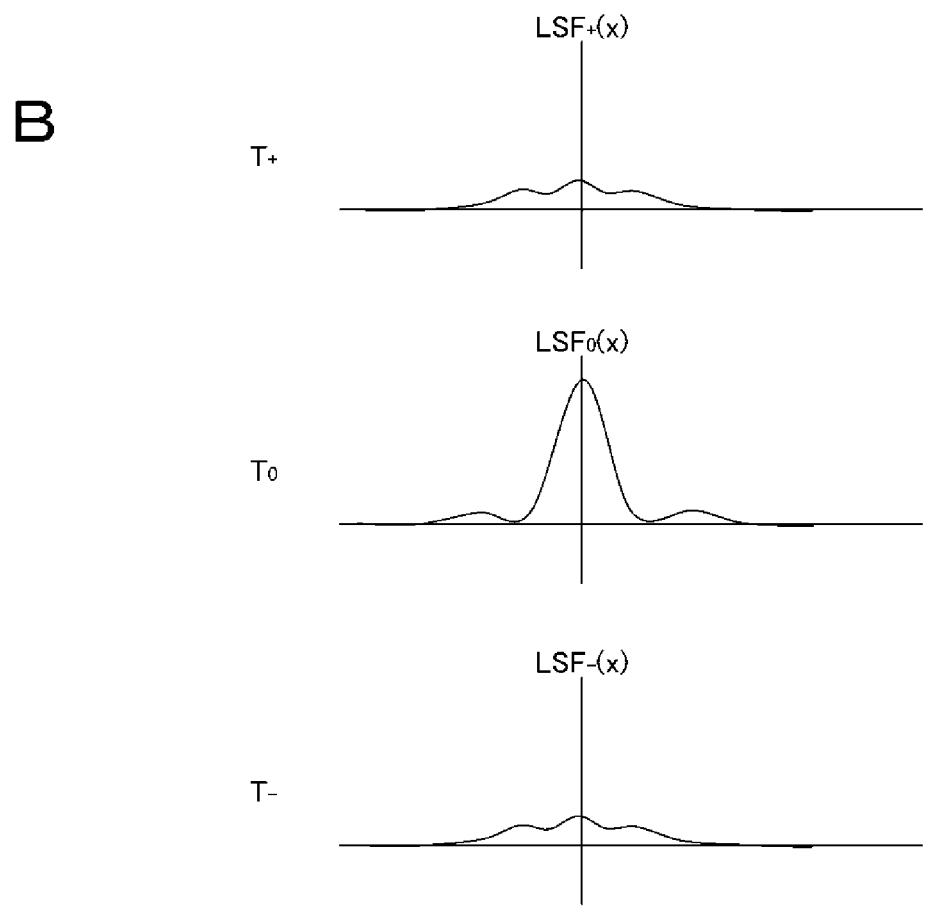

As shown in FIG. 2A, since the pattern of marks (indicated by diagonal line regions) are recorded at the same width W along the tracks, a reproduction signal can be calculated using a one-dimensional distribution LSF(x) which is obtained through integration with the mark width W with respect to the center $y_0$ of the mark string.

$$LSF(x) = \int_{y_0-w/2}^{y_0+w/2} PSF(x, y)dy \quad (2)$$

When the mark string is indicated by a one-dimensional distribution m(x) of 0 and 1, m(x) is expressed by the following equation.

$$m(x) = \mathrm{Mark}(x, y_0) \quad (3)$$

A reproduction signal s(x) can be calculated from the following equation.

$$s(x) = \int_{-\infty}^{+\infty} m(x'-x)LSF(x')dx' \quad (4)$$

In a case where a main track (reproduction target track) $T_0$ is recorded at $y_0=0$, $LSF_0$ is expressed by the following equation.

$$LSF_0(x) = \int_{-w/2}^{+w/2} PSF(x, y)dy, \; m_0(x) = \mathrm{Mark}(x, 0) \quad (5)$$

A track adjacent to the upper side (outer circumferential side) of the main track $T_0$ is indicated by $T_+$, and a track adjacent to the lower side (inner circumferential side) of the main track $T_0$ is indicated by $T_-$. An LSF of a crosstalk component from each of the adjacent tracks is as follows when a track pitch is indicated by $T_p$.

$$LSF_+(x) = \int_{T_p-w/2}^{T_p+w/2} PSF(x, y)dy, \; m_+(x) = \mathrm{Mark}(x, T_p) \quad (6)$$

$$LSF_-(x) = \int_{-T_p-w/2}^{-T_p+w/2} PSF(x, y)dy, \; m_-(x) = \mathrm{Mark}(x, -T_p) \quad (7)$$

In addition, when crosstalk of the two adjacent tracks is taken into consideration, the reproduction signal is as follows.

$$s(x) = \int_{-\infty}^{+\infty} m_+(x'-x)LSF_+(x')dx' + \qquad (8)$$
$$\int_{-\infty}^{+\infty} m_0(x'-x)LSF_0(x')dx' + \int_{-\infty}^{+\infty} m_-(x'-x)LSF_-(x')dx'$$

FIGS. 2A and 2B show an LSF when there is no skew in the radial direction. In FIG. 2A, since there is no skew, the circular spot SP scans the center of the main track $T_0$. In this state, as shown in FIG. 2B, $LSF_+(x)$ of the adjacent track $T_+$ and $LSF_-(x)$ of the adjacent track $T_-$ vary similarly. In addition, crosstalk components from the adjacent tracks have LSF which vary similarly.

Figure 3:
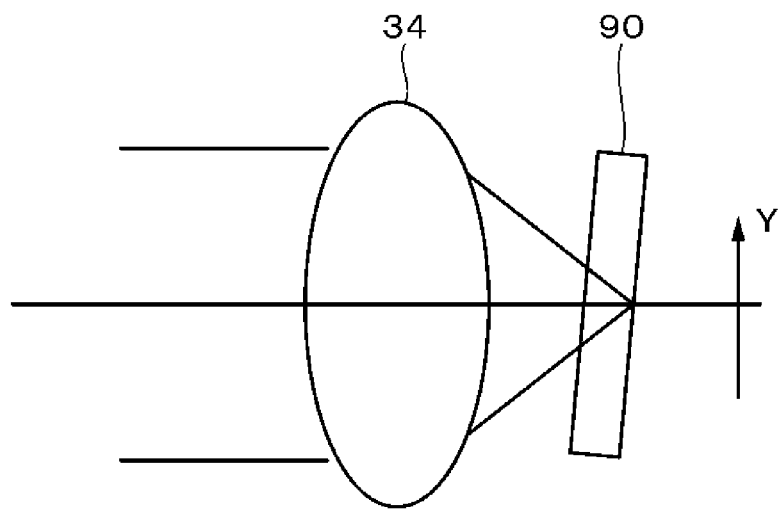
FIG. 3 is a schematic diagram for explaining a skew according to an embodiment of the present disclosure.
Figure 4:
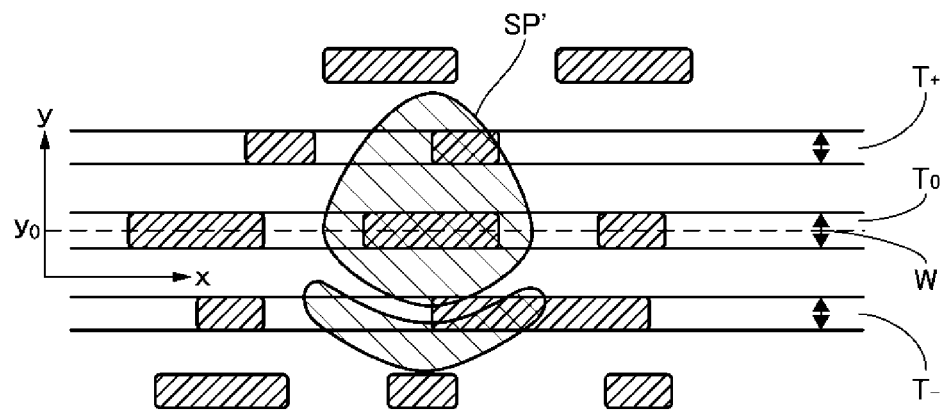
FIGS. 4A and 4B are schematic diagrams for explaining a shape of spot and LSF in the presence of a skew.
Figure 4:
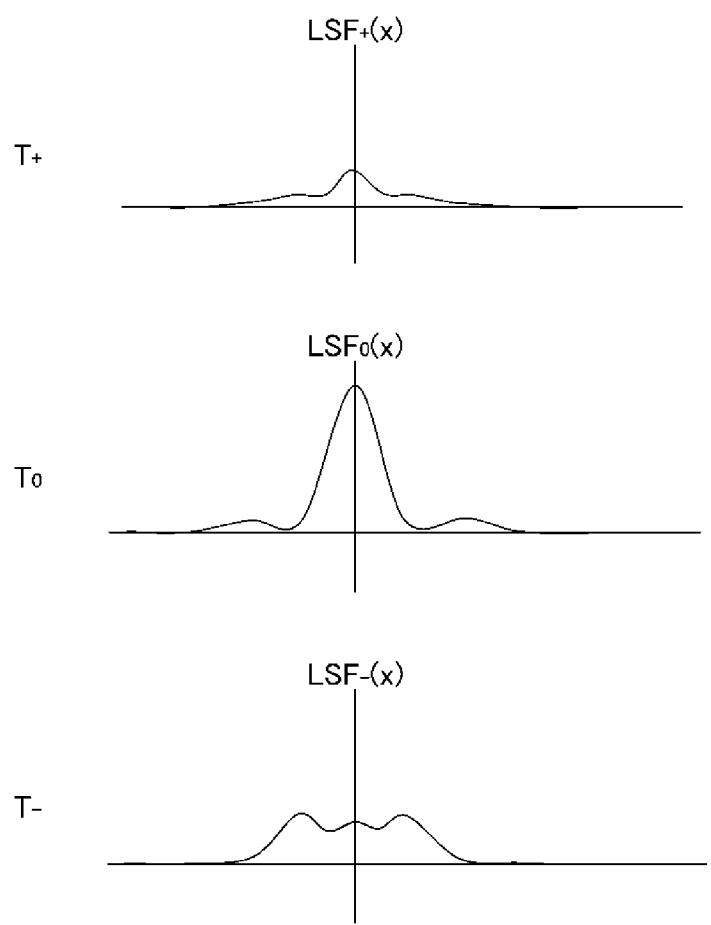

As shown in FIG. 3, when the optical disc 90 is skewed from the right angle with respect to the optical axis of an objective lens 34, a phase disturbance (aberration) is caused in the light distribution on the objective lens 34, and the light spot (PSF) is deformed. That is, as shown in FIG. 4A, a coma aberration occurs, and thus a light beam spot SP' with a shape different from the circular shape is generated. The spot SP' includes a circular spot part and a crescent spot part. A position where the crescent spot part is generated is reversed depending on a skew direction. An LSF of a case where there is a skew is calculated using this spot (PSF). FIG. 4B shows an LSF when there is a skew of the optical disc. In addition, detrack may be calculated by offsetting $y_0$.

(Calculation Example of LSF)

A calculation example (simulation result) of an LSF will be described. Here, the calculation is performed based on the following example.

$\lambda$=405 nm

NA=0.85

Rim (rim intensity)=0.65/0.65

Figure 5:
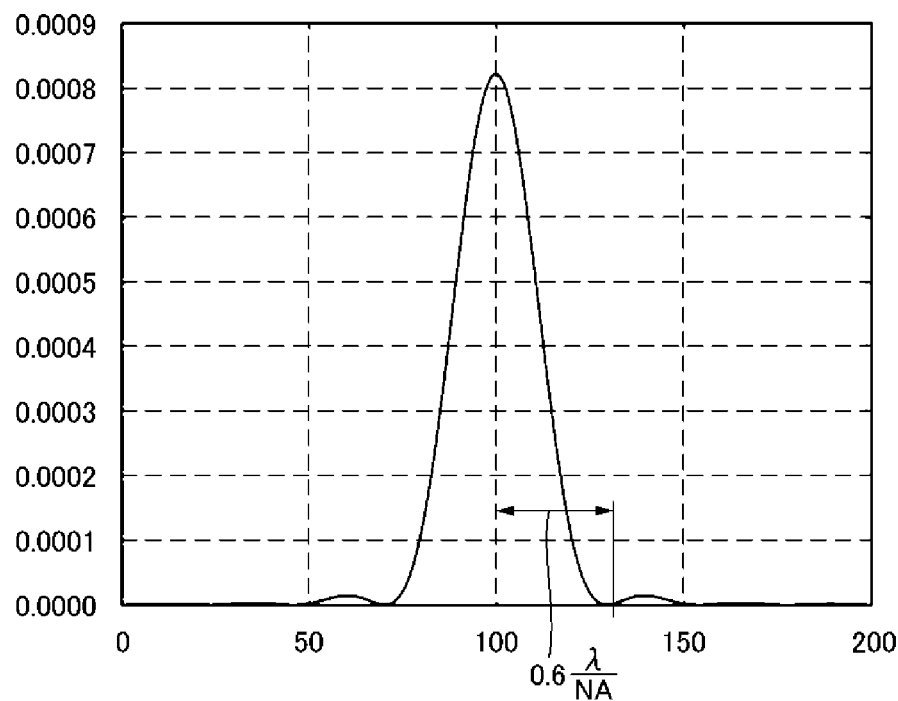
FIGS. 5A and 5B are schematic diagrams illustrating LSF of a main track and LSF of adjacent tracks in the absence of a skew.
Figure 5:
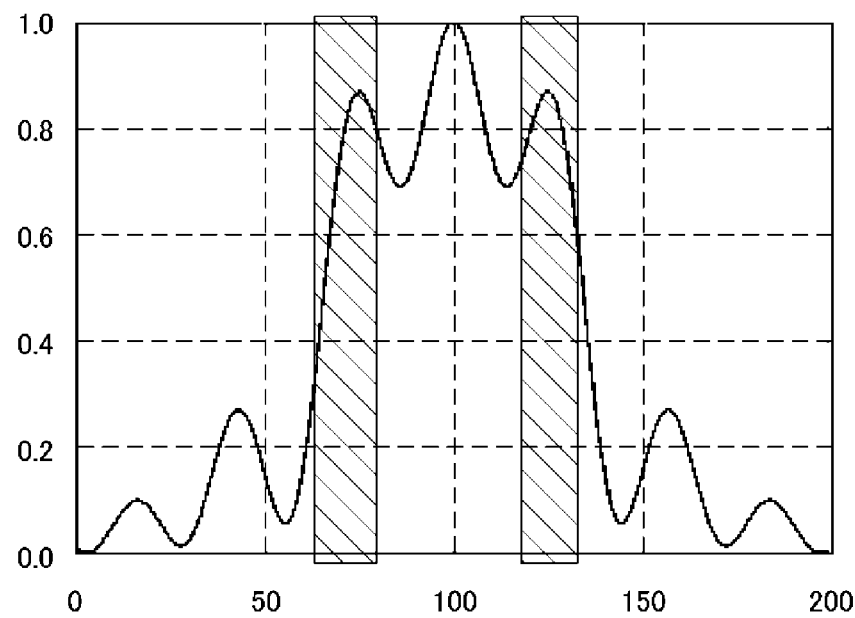

Tp=0.32 μm mark width=170 nm 1T (smallest mark length)≈56 nm (capacity per layer of the Blu-ray Disc is 33.4 GB): values ±4, 5 and 6 before and after ±5 clocks A calculation result of an LSF of a reading target track (hereinafter, referred to as a main track) in this case is shown in FIG. 5A, and a calculation result of an LSF of adjacent tracks is shown in FIG. 5B. In the example shown in FIGS. 5A and 5B, there is no skew, and LSFs of the two adjacent tracks are the same. As shown in FIG. 5A, it is known that a position where an LSF of the main track becomes 0 is 0.61 $\lambda$/NA.

In FIG. 5B, a skew signal may be obtained by obtaining a difference between the left and right tracks for the sum (integrated value) of tap coefficients of the regions indicated by the diagonal lines. That is, a skew signal is obtained from the following equation. The reason of comparison with sums of tap coefficients of the diagonal line regions is that a difference between a sum of $LSF_+$ and a sum of $LSF_-$ of two adjacent tracks ($T_+$ and $T_-$) increases in the part when there is a skew. In addition, a difference between sums of tap coefficient of the diagonal line regions is reduced depending on detrack. As an example, the respective regions become regions of ±4th clock, ±5th clock, or ±6th clock. However, this numerical value is an example, and a plurality of predetermined clocks may be set as a width of the diagonal line region in consideration of a track pitch and the like. For example, as a range including the region, ±($\lambda$/2/NA to $\lambda$/NA) is set.

Skew signal=(sum of tap coefficients of diagonal line region part of $T_+$)−(sum of tap coefficients of diagonal line region part of $T_-$)

In an embodiment of the present disclosure, crosstalk cancellation is achieved by supplying a reproduction signal from the adjacent tracks to a digital filter and by subtracting an output of the digital filter from a reproduction signal of the main track. The tap coefficient is a coefficient of a tap of the digital filter. A relationship between the above-described LSF and a tap coefficient of the filter will be described below.

When the reproduction signal s(x) expressed by the above-described Equation (4) is sampled with an interval of the clock length $\Delta$, this may be expressed as follows.

$$s_k = \sum_{n=-N}^{N} m_{k-n} LSF_n, \qquad (9)$$
$$(s_k = s(k\Delta), m_k = m(k\Delta), LSF_k = LSF(k\Delta))$$

A reproduction signal of the main track for achieving crosstalk cancellation may be expressed as follows.

$$s_k = \sum_{n=-N}^{N} m_{+,k-n} LSF_{+,n} = \sum_{n=-N}^{N} m_{0,k-n} LSF_{0,n} + \sum_{n=-N}^{N} m_{-,k-n} LSF_{-,n} \qquad (10)$$

A reproduction signal of an adjacent track may be expressed as follows.

$$s_{+,k} = \sum_{n=-N}^{N} m_{++,k-n} LSF_{+,n} + \sum_{n=-N}^{N} m_{+,k-n} LSF_{0,n} + \sum_{n=-N}^{N} m_{0,k-n} LSF_{-,n} \qquad (11)$$

$$s_{-,k} = \sum_{n=-N}^{N} m_{0,k-n} LSF_{+,n} + \sum_{n=-N}^{N} m_{-,k-n} LSF_{0,n} + \sum_{n=-N}^{N} m_{--,k-n} LSF_{-,n} \qquad (12)$$
$$\to s_{-,k} \approx m_{-,k}$$

In addition, the tap coefficients other than $LSF_{00}$ are small and approximate.

Therefore, a signal from which crosstalk is canceled may be expressed as follows.

$$\tilde{s}_k = s_k - \sum_{n=-N}^{N} m_{+,k-n} LSF_{+,n} - \sum_{n=-N}^{N} m_{-,k-n} LSF_{-,n} \approx \qquad (13)$$
$$s_k - \sum_{n=-N}^{N} s_{+,k-n} LSF_{+,n} - \sum_{n=-N}^{N} s_{-,k-n} LSF_{-,n}$$

Therefore, crosstalk can be canceled from the reproduction signals $s_{+k}$ and $s_{-k}$ of the adjacent tracks by using taps of a finite impulse response (FIR) filter having $LSF_{+n}$, and $LSF_{-n}$ as tap coefficients. In other words, if a tap coefficient of the digital filter that cancels crosstalk is determined, a skew can be determined using the tap coefficient.

In addition, with reference to FIGS. 6A to 6E, a description will be made of calculation results of LSF simulation when there is a skew. FIG. 6A shows $LSF_+$ and $LSF_-$ of the respective adjacent tracks $T_+$ and $T_-$ when Rskew (skew in the radial direction)=0.1 deg. FIG. 6B shows $LSF_+$ and $LSF_-$ of the respective adjacent tracks $T_+$ and $T_-$ when Rskew=0.2 deg. FIG. 6C shows $LSF_+$ and $LSF_-$ of the respective adjacent tracks $T_+$ and $T_-$ when Rskew=0.3 deg. FIG. 6D shows $LSF_+$ and $LSF_-$ of the respective adjacent tracks $T_+$ and $T_-$ when Rskew=0.4 deg. FIG. 6E shows $LSF_+$ and $LSF_-$ of the respective adjacent tracks $T_+$ and $T_-$ when Rskew=0.5 deg.

As can be seen from these calculation results, the greater the skew, the larger the difference between sums of tap coefficients of the diagonal line regions. Therefore, a skew signal can be obtained from the above equations. In addition, in a case where a direction of a skew is reverse, a relationship between $LSF_+$ and $LSF_-$ is reversed, and thus a direction of the skew can also be detected.

In the above description, an LSF using a skew in the disc radial direction has been described. With reference to FIGS. 7A to 7C, a description will be made of calculation results of LSF simulation of the adjacent tracks when there is detrack. FIG. 7A shows $LSF_+$ and $LSF_-$ of the respective adjacent tracks $T_+$ and $T_-$ when detrack=30 nm FIG. 7B shows $LSF_+$ and $LSF_-$ of the respective adjacent tracks $T_+$ and $T_-$ when detrack=60 nm FIG. 7C shows $LSF_+$ and $LSF_-$ of the respective adjacent tracks $T_+$ and $T_-$ when detrack=90 nm.

Figure 6:
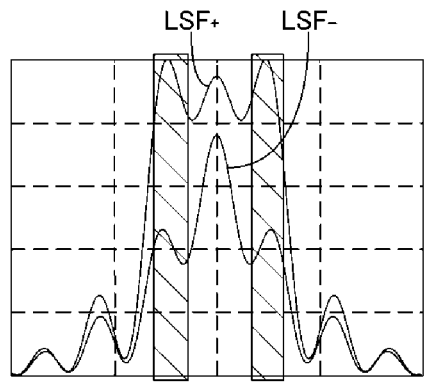
FIGS. 6A to 6E are schematic diagrams illustrating an example of simulation results of an LSF.
Figure 6:
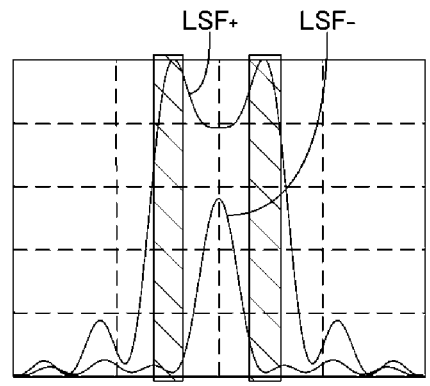
Figure 6:
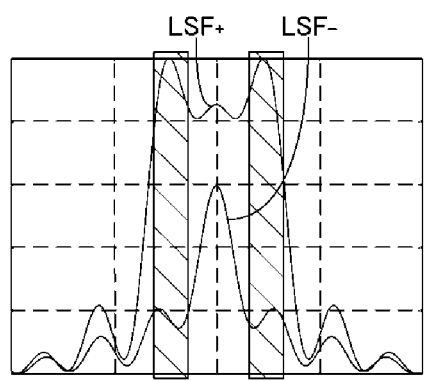
Figure 6:
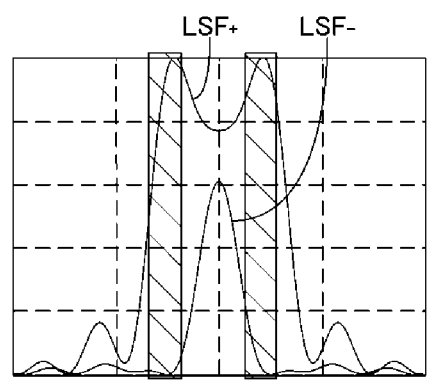
Figure 6:
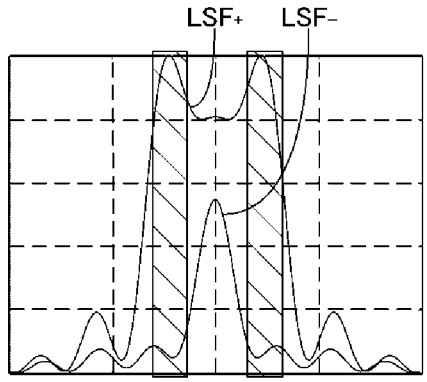
Figure 7:
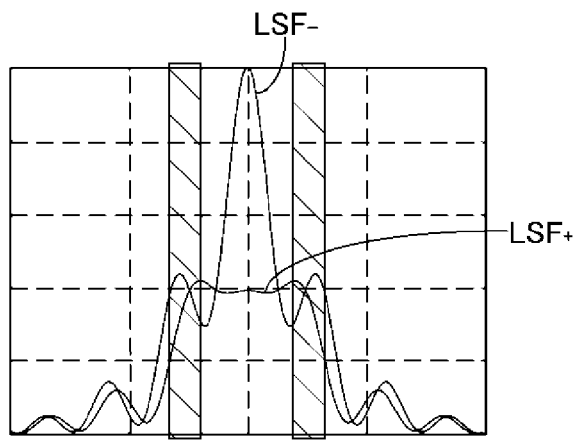
FIGS. 7A to 7C are schematic diagrams illustrating examples of simulation results of an LSF in the presence of detrack.
Figure 7:
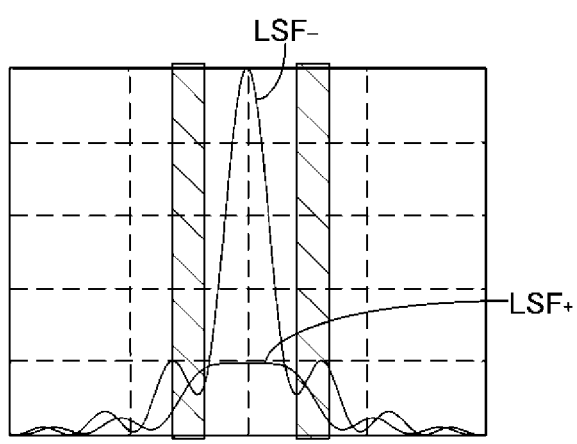
Figure 7:
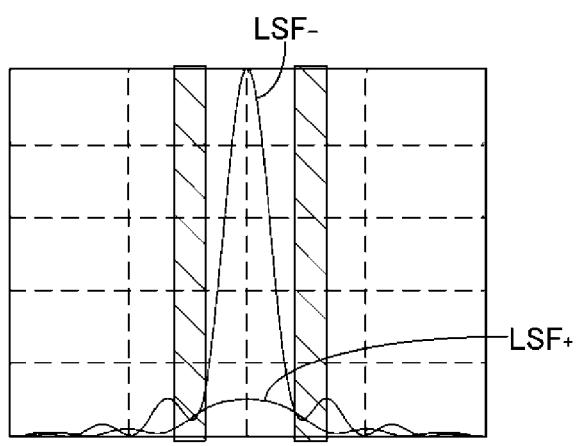

In FIG. 7, the same diagonal line regions as those shown in FIG. 6 are illustrated. In a similar manner to the case of obtaining a skew signal, sums of tap coefficients of the diagonal line region parts are respectively obtained for $LSF_+$ and $LSF_-$, and a difference between the sums of the tap coefficients is calculated. As shown in FIG. 7, a difference between sums of the tap coefficients obtained for $LSF_+$ and $LSF_-$ in the diagonal line region parts is small regardless of the amount of detrack. In other words, a difference between sums of tap coefficients varies according to a skew, whereas, when detrack occurs, a difference between sums of tap coefficients is small, and a variation in the difference between sums of tap coefficients according to a detrack amount is small. Therefore, in an embodiment of the present disclosure, it is possible to obtain a skew signal from a difference between sums of tap coefficients of predetermined region parts almost without being influenced by detrack.

The above-described parameters such as λ are set in a similar manner, and then a skew signal is calculated using the following equation. Here, $R_n$ indicates a value of a position of the n-th clock in $LSF_-$ of the track $T_-$, $L_n$ indicates a value of a position of the n-th clock in $LSF_+$ of the track $T_+$, and $Center_0$ is a reference value for normalization. For example, $Center_0$ indicates a value of a position of the 0-th clock in $LSF_0$ of the main track.

Figure 8:
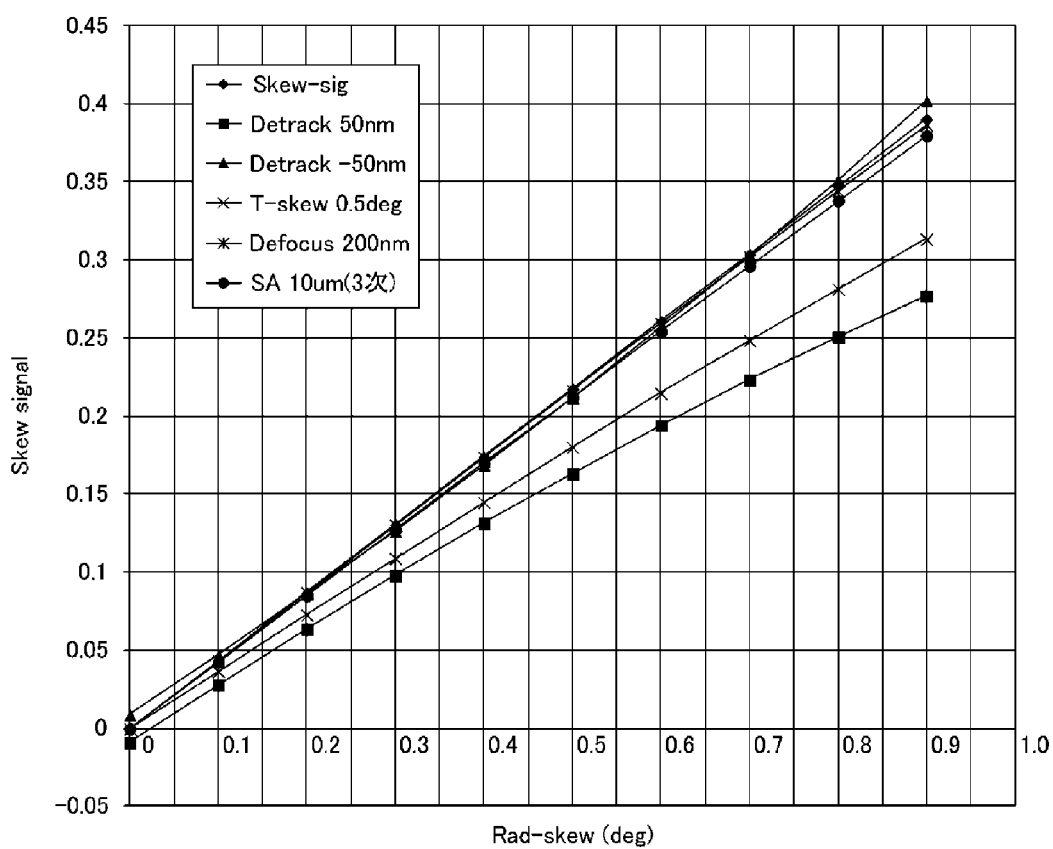
FIG. 8 is a graph showing a variation of a skew signal with a skew.

Skew signal $Sig=\{(R_{-6}+R_{-5}+R_{-4}+R_4+R_5+R_6)-(L_{-6}+L_{-5}+L_{-4}+L_4+L_5+L_6)\}/Center_0$ FIG. 8 shows a result in which a level variation of a skew signal for a skew in the radial direction of the optical disc is obtained through simulation (above equation). FIG. 8 shows variations of skew signals exemplified in the following.

Skew signal when there is no detrack
Skew signal when detrack is 50 nm
Skew signal when detrack is −50 nm
Skew signal when a skew in the track tangential direction is 0.5 deg
Skew signal when defocus is 200 nm
Skew signal when SA is 10 μm (third order)

As can be seen from FIG. 8, the detrack, the skew in the track tangential direction, the defocus, the SA, and the like have relatively little influence on a skew signal, and thus it is possible to obtain a skew signal corresponding to a skew in the radial direction.

(First Example of Signal Processing Unit)

Figure 9:
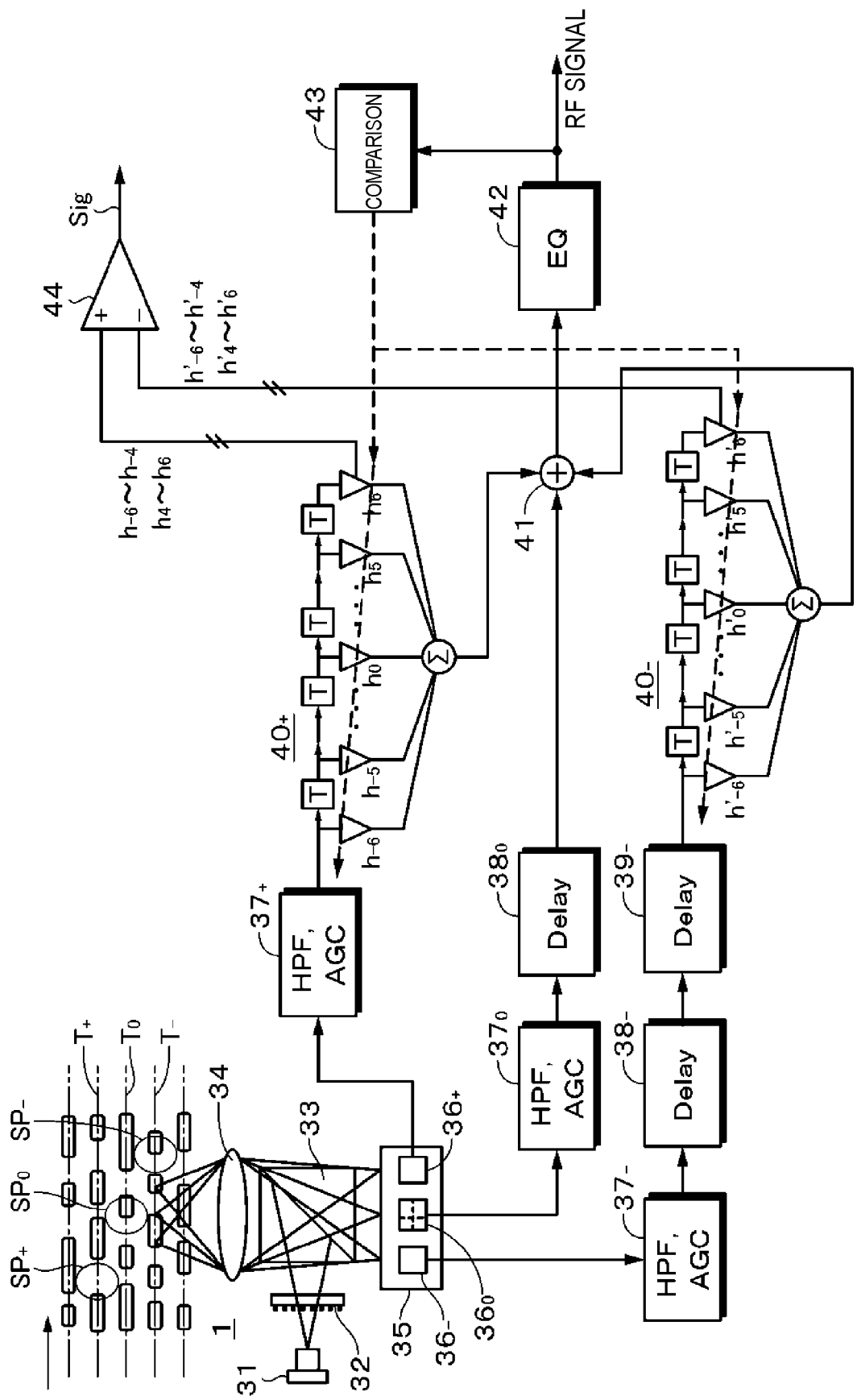
FIG. 9 is a block diagram of a first example of a signal processing unit according to an embodiment of the present disclosure.

With reference to FIG. 9, a description will be made of a first example of the signal processing unit according to an embodiment of the present disclosure. The signal processing unit corresponds to the data detection processing unit 5 in FIG. 1. In addition, FIG. 9 shows a configuration regarding crosstalk cancellation, and the optical block servo circuit and the like are shown in FIG. 1 and are thus not shown in FIG. 9.

In FIG. 9, the optical pickup 1 includes a laser diode 31, a diffraction grating 32, a polarization beam splitter 33, an objective lens 34, and the like.

The diffraction grating 32 generates a 0-th order diffraction light spot $SP_0$, a +1st order diffraction light spot $SP_+$, and a −1st order diffraction light spot $SP_-$, which are irradiated onto the optical disc via the polarization beam splitter 33 and the objective lens 34. Spacing between these spots is to be equal to a track pitch with respect to the disc radial direction. The 0-th order diffraction light spot $SP_0$ scans the main track $T_0$, and the +1st order diffraction light spot $SP_+$ and the −1st order diffraction light spot $SP_-$ respectively scan the adjacent tracks $T_+$ and $T_-$. The return light from the optical disc is transmitted through the polarization beam splitter 33 and is irradiated onto a light detector 35.

The light detector 35 has light receiving areas $36_0$, $36_+$ and $36_-$. The light receiving area $36_0$ has four divided light receiving areas, for example, by the line in the track direction and the line crossing the track. The return light obtained by scanning the main track $T_0$ with the spot $SP_0$ is incident to the light receiving area $36_0$ of the light detector 35. The return light obtained by scanning the adjacent track $T_+$ with the spot $SP_+$ is incident to the light receiving area $36_+$ of the light detector 35. The return light obtained by scanning the adjacent track $T_-$ with the spot $SP_-$ is incident to the light receiving area $36_-$ of the light detector 35.

An addition signal of the respective detection signals of the four divided light receiving areas of the light receiving area $36_0$ is converted into a digital signal and is then supplied to a high-pass filter (called HPF) and automatic gain control (AGC) $37_0$. An output signal of the HPF and AGC $37_0$ is supplied to a combining circuit 41 via a delay circuit $38_0$. An output signal of the combining circuit 41 is output as an RF signal (a reproduction signal of the main track) via an equalizer (EQ) 42.

A detection signal of the light receiving area $36_+$ is converted into a digital signal and is then supplied to an HPF and AGC $37_+$. An output signal of the HPF and AGC $37_+$ is input to a digital filter, for example, an FIR filter $40_+$. The FIR filters $40_+$ and $40_-$ are variable coefficient filters. An output signal of the FIR filter $40_+$ is supplied to the combining circuit 41. A detection signal of the light receiving area $36_-$ is converted into a digital signal and is then supplied to an HPF and AGC $37_-$. An output signal of the HPF and AGC $37_-$ is input to the FIR filter $40_-$ via a delay circuit $38_-$ and a delay circuit $39_-$. An output signal of the FIR filter $40_-$ is supplied to the combining circuit 41. A direct current and low frequency component are removed through the HPF and AGC $37_0$, the HPF and AGC $37_+$, and the HPF and AGC $37_-$, and thereby achieving level control.

In FIG. 9, the arrow direction is a rotation direction of the optical disc. In order to cancel crosstalk, a reproduction position of the main track $T_0$ is necessary to match reproduction positions of the adjacent track $T_+$ and the adjacent track $T_-$ in the radial direction of the optical disc. Since the diffraction grating 32 generates three beam spots, a deviation occurs in the track direction between the positions of the three beam spots. The time difference due to this deviation is corrected by the delay circuits $38_0$, $38_-$ and $39_-$. In other words, since the return light is incident to the optical pickup 1 in order of the track $T_-$, the track $T_0$, and the track $T_+$, the delay circuits $38_0$, $38_-$ and $39_-$ are provided so as to match the timing of the reproduction signal of the track $T_+$.

In a state in which the reproduction positions are aligned, the reproduction signal of the main track includes crosstalk signals due to the return light from the adjacent tracks $T_+$ and T_. The crosstalk signals are generated, and the generated crosstalk signals are subtracted from the reproduction signal of the main track in the combining circuit 41, thereby canceling crosstalk.

An output of the combining circuit 41 is supplied to the equalizer (EQ) 42. The equalizer 42 performs a PR adaptive equalization process. That is, the reproduction signal from the combining circuit 41 is equalized to be approximated to a targeted PR waveform. An output signal (RF signal) of the equalizer 42 is supplied to a comparator 43. The comparator 43 compares the output signal (RF signal) of the equalizer 42 with a target signal. The target signal is assumed to be an ideal waveform without noise. For example, in a case of PR (Partial Response) (1,2,2,2,1) class, the target signal has 8-level. In addition, the target signal is a signal obtained when there is no crosstalk, and, for example, a well-known target signal may be recorded at a predetermined position on an optical disc in advance, and the target signal may be reproduced for use.

An error between the RF signal and the target signal is obtained in the comparator 43. This error is used to control of tap coefficients of the respective FIR filters $40_+$ and $40_-$. The FIR filters $40_+$ and $40_-$ include a plurality of delay elements, coefficient multipliers which multiply the tap coefficients ($h_{-6}, h_{-5}, h_{-4}, \ldots, h_0, \ldots, h_4, h_5,$ and $h_6$) and ($h'_{-6}, h'_{-5}, h'_{-4}, \ldots, h'_0, \ldots, h'_4, h'_5,$ and $h'_6$) by an input at each time point, and adders which add outputs of the coefficient multipliers.

The tap coefficient of each of FIR filters $40_+$ and $40_-$ are controlled, and thus crosstalk mixed from the adjacent tracks on both sides for the reproduction signal of the main track can be removed. In other words, the same component as a crosstalk component from the track $T_+$ is generated by the FIR filter $40_+$, the same component as a crosstalk component from the track $T_-$ is generated by the FIR filter $40_-$, and the components are subtracted from a reproduction signal of the main track $T_0$, thereby canceling crosstalk.

The above-described tap coefficient of each of the FIR filters $40_+$ and $40_-$ are supplied to a calculation unit 44. The calculation unit 44 generates a skew signal through the following calculation. This skew signal is supplied to the skew correction unit provided in association with the optical pickup 1 so that a skew is corrected.

Skew signal $Sig=(h_{-6}+h_{-5}+h_{-4}+h_4+h_5+h_6)-(h'_{-6}+h'_{-5}+h'_{-4}+h'_4+h'_5+h'_6)$ (Calculation Example of Tap Coefficient of FIR Filter) A description will be made of an example of a calculation result (computer simulation) of the tap coefficient of each of the FIR filters $40_+$ and $40_-$. The simulation is performed based on the following settings.

$S_0$: Reproduction signal of main track, $S_+$: Reproduction signal of track $T_+$, $S_-$: Reproduction signal of track $T_-$, and d: Original data (known data is used because simulation is performed)

Optical system: λ (wavelength)=405 nm, and NA=0.85

The reproduction signals $S_0$, $S_+$, $S_-$ are normalized to the level of (max, min=±0.5).

Only the reproduction signal $S_0$ passes through an equalizer of five taps. A tap coefficient of the equalizer is set to the following value depending on the shortest wavelength (1T).

fr=[0.013,0.01,0.95,0.01,0.013]:1T=75 nm $fr=[-0.32,0.015,1.31,0.105,-0.32]:1T=56$ nm

An ideal (average) level corresponding to data (known) for two previous and subsequent clocks is created. Since data is 5 bits, there are ($2^5$=32) ideal levels. A table of these ideal levels is held in a memory or the like. A tap coefficient $fr_+$ and a tap coefficient $fr_-$ of the FIR filters (FIR filters $40_+$ and $40_-$) for the reproduction signals of the adjacent tracks are set to 15 taps.

An ideal level which is the closest to $S_0+fr_+ S_++fr_- S_-$ (an output signal of the combining circuit 41) is indicated by r. From the following equation, err is calculated. This calculation is performed by the comparator 43.

err=$r-(S_0+fr_+S_++fr_-S_-)$

In addition, the tap coefficients of the FIR filters are updated using the following equations. This calculation indicates a process of finding a solution through a steepest descent method.

$fr_+=fr_+-0.01\times err \times S_+$ $fr_-=fr_--0.01\times err \times S_-$

Figure 10:
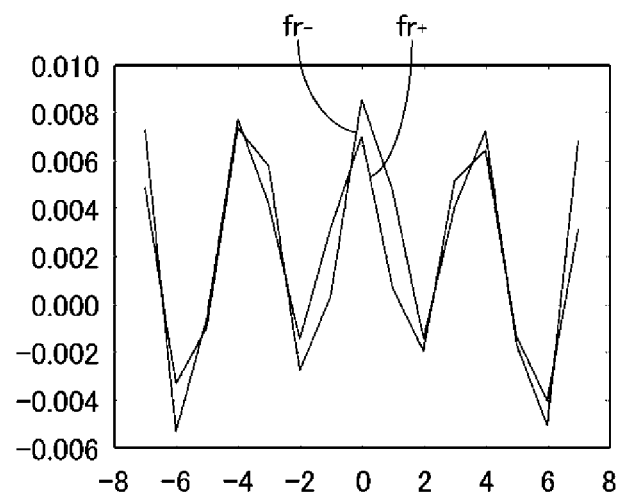
FIGS. 10A to 10C are graphs showing a calculation example (computer simulation) of a tap coefficient of an FIR filter.
Figure 10:
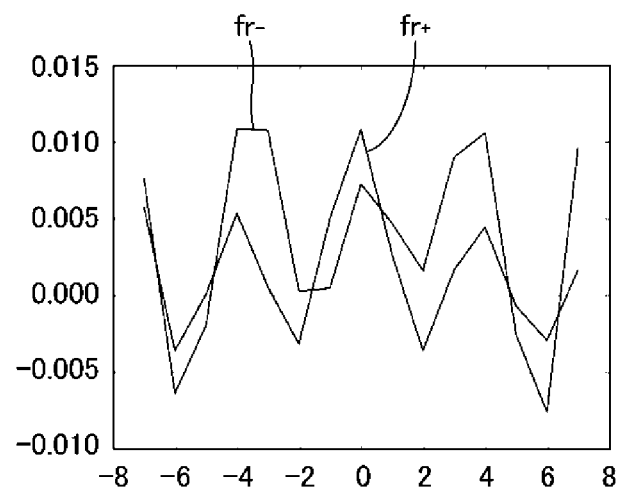
Figure 10:
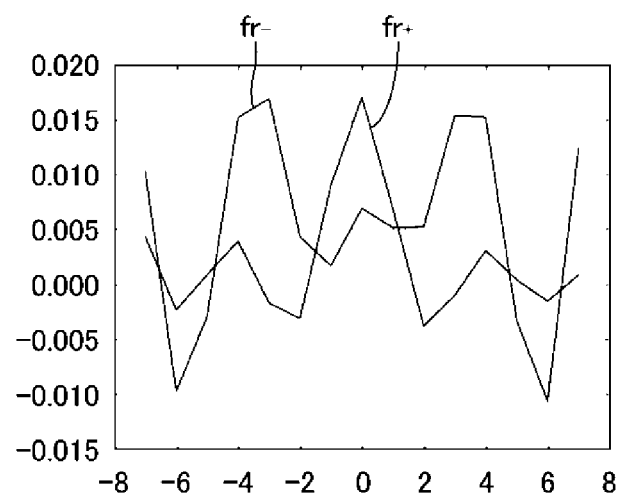
Figure 11:
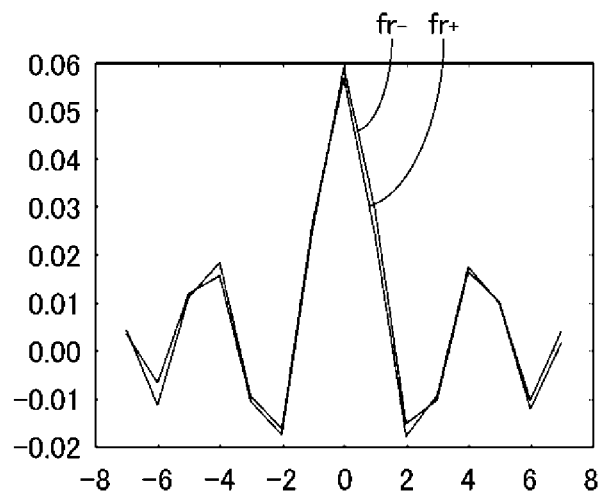
FIGS. 11A to 11C are graphs showing a calculation example (computer simulation) of a tap coefficient of the FIR filter.
Figure 11:
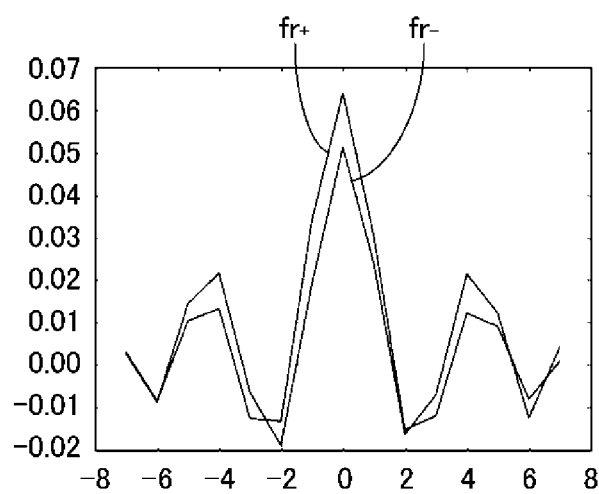
Figure 11:
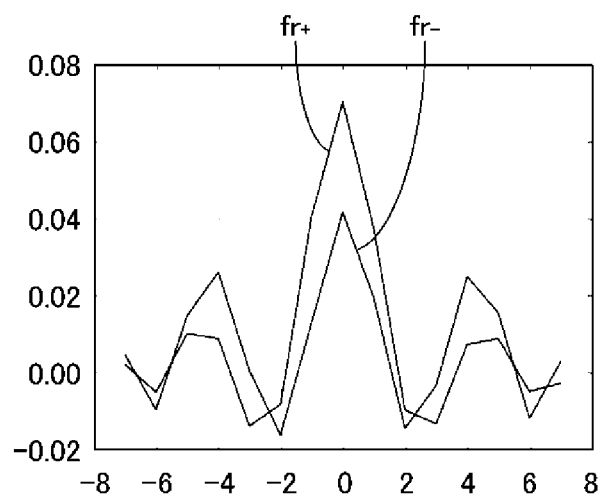
Figure 12:
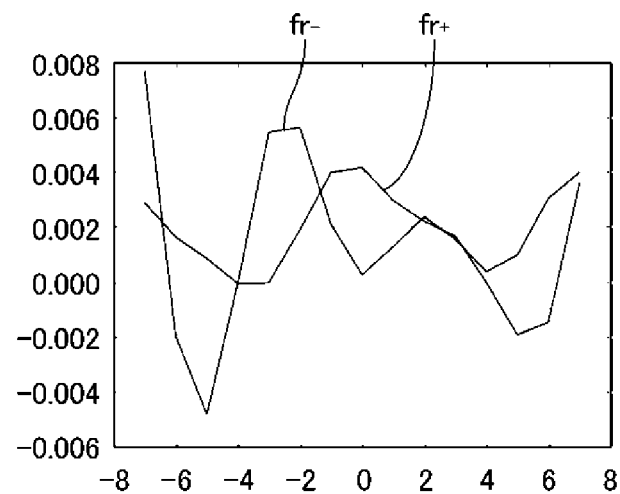
FIGS. 12A to 12C are graphs showing a calculation example (computer simulation) of a tap coefficient of the FIR filter.
Figure 12:
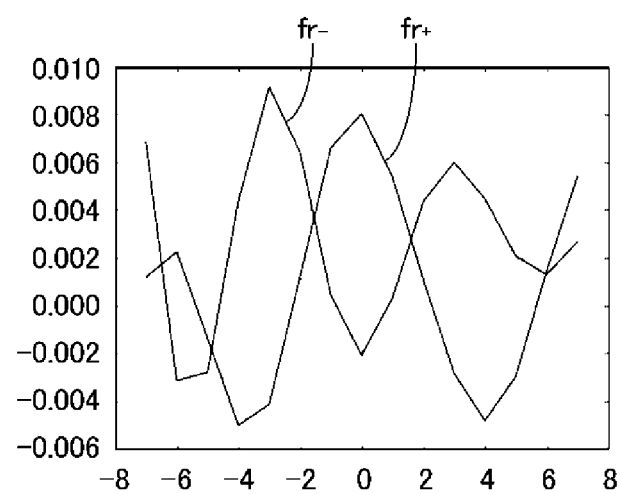
Figure 12:
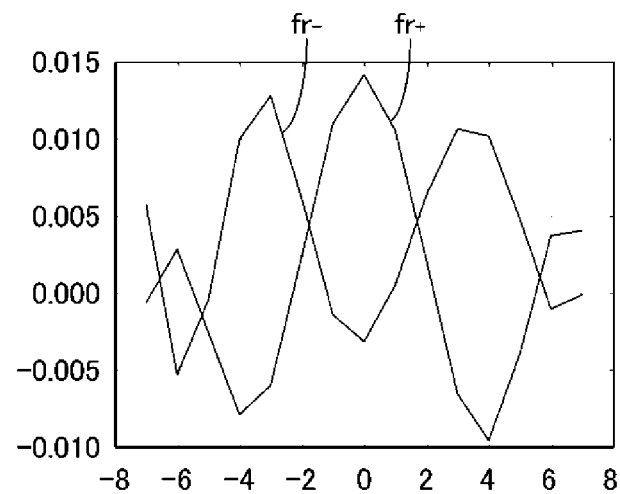
Figure 13:
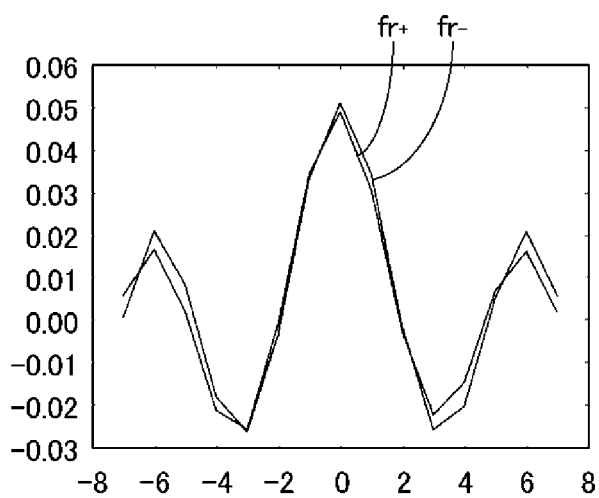
FIGS. 13A to 13C are graphs showing a calculation example (computer simulation) of a tap coefficient of the FIR filter.
Figure 13:
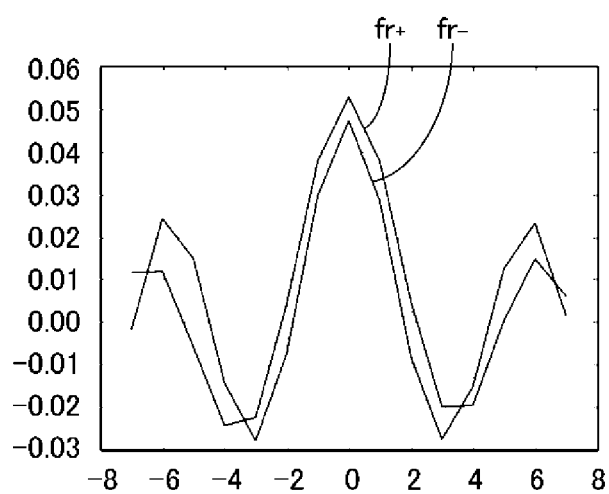
Figure 13:
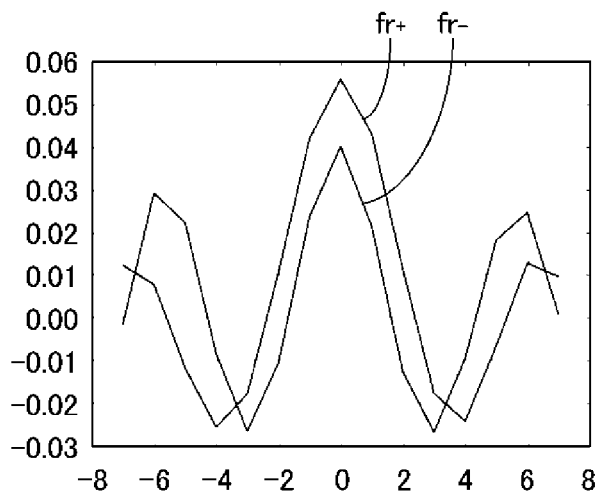

FIGS. 10A to 13C show simulation results, in which the transverse axis expresses a tap number of the filter, and the longitudinal axis expresses a value of a tap coefficient of the filter. Simulation results of FIGS. 10A to 10C relate to a case of (1T=75 nm and Tp (track pitch)=0.32 μm). FIG. 10A shows tap coefficients when Rskew (a skew in the radial direction)=0. As shown in FIG. 10A, two tap coefficients $fr_+$ and $fr_-$ have a substantially similar value. FIG. 10B shows tap coefficients when Rskew=0.2 deg. As shown in FIG. 10B, two tap coefficients have different values. FIG. 10C shows tap coefficients when Rskew=0.4 deg. As shown in FIG. 10C, two tap coefficients have different values, and the difference is greater than the difference between the tap coefficients of the case of Rskew=0.2 deg, and thus a skew signal have a larger value.

Simulation results of FIGS. 11A to 11C relate to a case of (1T=75 nm (disc capacity per layer: 25 GB) and Tp (track pitch)=0.22 μm). FIG. 11A shows tap coefficients when Rskew=0. As shown in FIG. 11A, two tap coefficients $fr_+$ and $fr_-$ have a substantially similar value. FIG. 11B shows tap coefficients when Rskew=0.2 deg. As shown in FIG. 11B, two tap coefficients have different values. FIG. 11C shows tap coefficients when Rskew=0.4 deg. As shown in FIG. 11C, two tap coefficients have different values, and the difference is greater than the difference between the tap coefficients of the case of Rskew=0.2 deg, and thus a skew signal have a larger value.

Simulation results of FIGS. 12A to 12C relate to a case of (1T=56 nm (disc capacity per layer: 33 GB) and Tp (track pitch)=0.32 μm). FIG. 12A shows tap coefficients when Rskew=0. As shown in FIG. 12A, two tap coefficients $fr_+$ and $fr_-$ have different values. FIG. 12B shows tap coefficients when Rskew=0.2 deg. As shown in FIG. 12B, two tap coefficients have different values. FIG. 12C shows tap coefficients when Rskew=0.4 deg. As shown in FIG. 12C, two tap coefficients have different values. As can be seen from FIGS. 12A to 12C, the larger Rskew, the greater the difference between the tap coefficients, and thus a skew signal have a larger value.

Simulation results of FIGS. 13A to 13C relate to a case of (1T=56 nm (disc capacity: 33 GB) and Tp (track pitch)=0.22 μm). FIG. 13A shows tap coefficients when Rskew=0. As shown in FIG. 13A, two tap coefficients $fr_+$ and $fr_-$ have a substantially similar value. FIG. 13B shows tap coefficients when Rskew=0.2 deg. As shown in FIG. 13B, two tap coefficients have different values. FIG. 13C shows tap coefficients when Rskew=0.4 deg. As shown in FIG. 13C, two tap coefficients have different values. As can be seen from FIGS. 13A to 13C, the larger Rskew, the greater the difference between the tap coefficients, and thus a skew signal have a larger value.

As described above, a skew signal can be generated by calculating tap coefficients of the FIR filters $40_+$ and $40_-$ for canceling crosstalk, and thus a skew can be corrected.

(Second Example of Signal Processing Unit)

Figure 14:
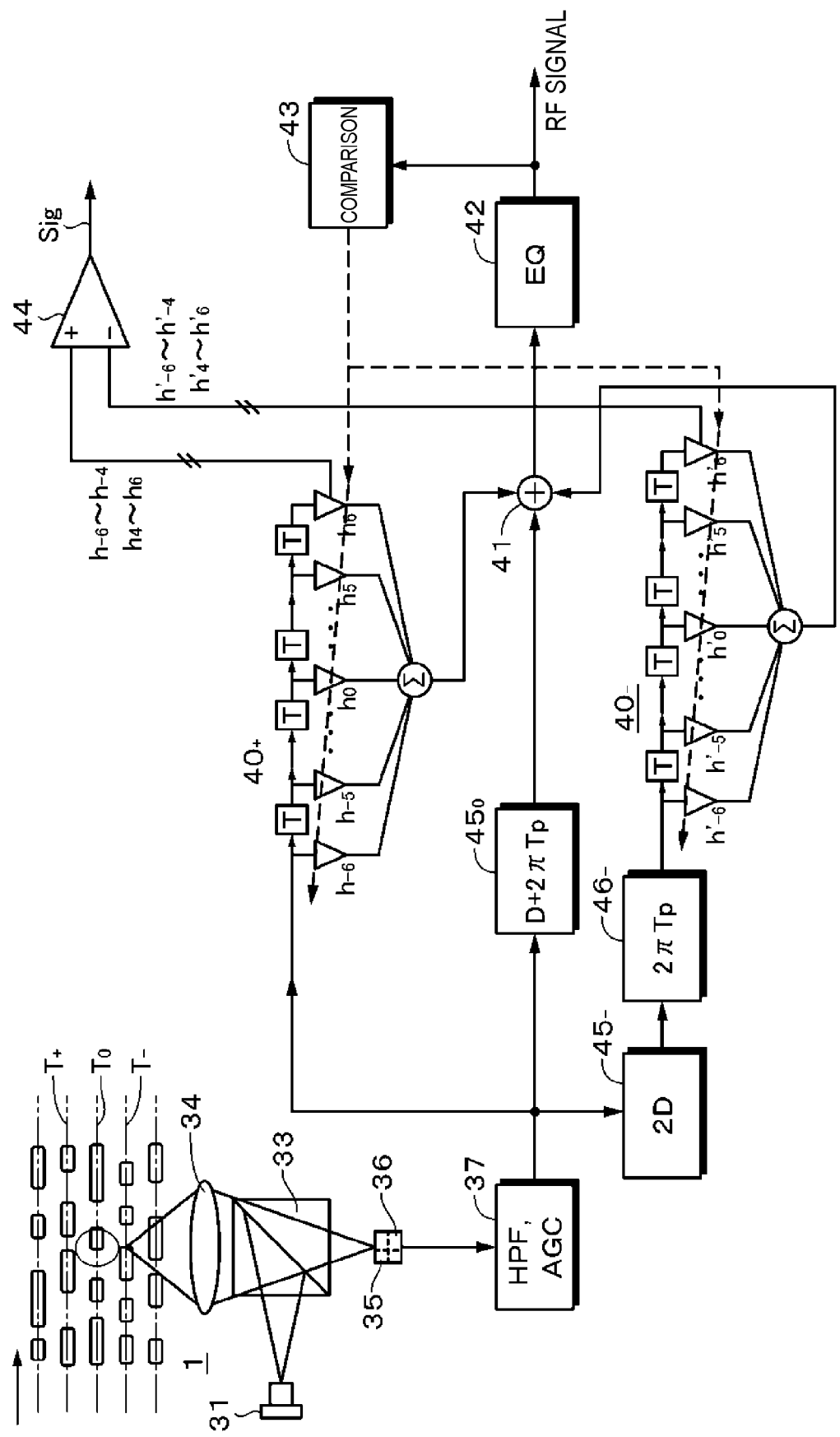
FIG. 14 is a block diagram of a second example of the signal processing unit according to an embodiment of the present disclosure.

A description will be made of a second example of the signal processing unit according to an embodiment of the present disclosure with reference to FIG. 14. Structural elements that correspond to the above-described first example of the signal processing unit shown in FIG. 9 are denoted with the same reference numerals.

In the second example, the optical pickup 1 does not include a diffraction grating. Therefore, the optical disc is irradiated with a single laser beam from the optical pickup 1. Reproduction signals of the adjacent tracks $T_+$ and $T_-$ on both sides of the main track $T_0$ are necessary to cancel crosstalk. In the second example, reproduction signals which are obtained after a single beam spot rotates approximately once are used as reproduction signals of the adjacent tracks.

When the track $T_0$ is used as a main track, a scanned track before one rotation of the track $T_0$ is an adjacent track $T_-$, and a scanned track after one rotation of the track $T_0$ is an adjacent track $T_+$. A reproduction signal obtained by scanning the track $T_-$ is supplied to a delay circuit $45_-$ via the HPF and AGC 37. An output signal of the delay circuit $45_-$ is supplied to a delay circuit $46_-$, and an output signal of the delay circuit $46_-$ is supplied to the FIR filter $40_-$. An output signal of the FIR filter $40_-$ is supplied to the combining circuit 41.

Therefore, it is possible to obtain a reproduction signal equivalent to a case where positions arranged in the disc radial direction are simultaneously reproduced in relation to the main track $T_0$ and the adjacent tracks $T_+$ and $T_-$. In the same manner as the first example of the above-described signal processing unit, it is possible to cancel crosstalk and obtain a skew signal Sig.

Figure 15:
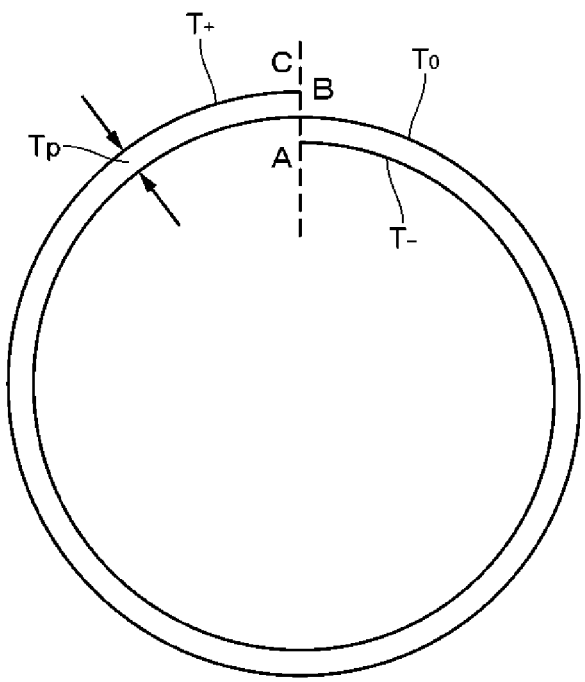
FIG. 15 is a schematic diagram for explaining the amount of delay.

Each delay amount of the delay circuits $45_0$, delay circuit $45_-$, and the delay circuit $46_-$ will be described. As shown in FIG. 15, a position A of the track $T_-$ which is located forward relative to a position B of the main track $T_0$ and a position C of the track $T_+$ backward relative to a position B of the main track $T_0$ are assumed to be arranged in the radial direction. When a track pitch is indicated by Tp, and a length between A and B is indicated by D, a length between B and C is $(D+2\pi Tp)$. Therefore, when the position of C is set as a current position, a delay time of the delay circuit $45_0$ for obtaining a reproduction signal of the position of B is $(D+2\pi Tp)$. In addition, a delay time of the delay circuit $45_-$ for obtaining a reproduction signal of the position of A is $(2D)$, and a delay time of the delay circuit $46_-$ is $(2\pi Tp)$.

Figure 16:
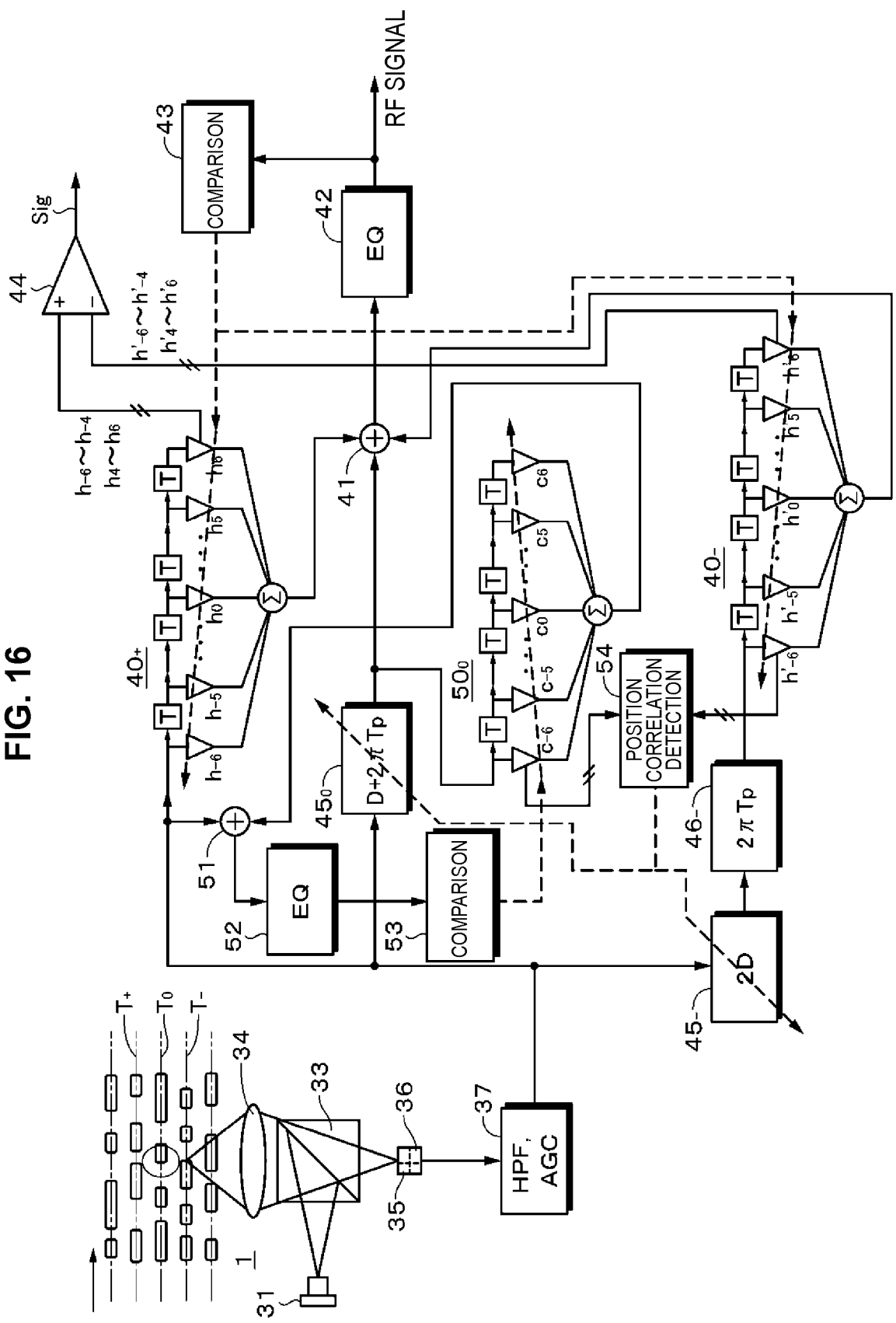
FIG. 16 is a block diagram illustrating a configuration of the second example of the signal processing unit having a configuration for control of the amount of delay.

Since the length D between B and C is not a fixed value, it is necessary to control delay amounts of the delay circuit $45_0$ and the delay circuit $45_-$ by using a configuration as shown in FIG. 16. The delay amount of $(2\pi Tp)$ is a fixed value corresponding to the track pitch Tp and thus is not necessary to be controlled.

In the configuration shown in FIG. 16, a position correlation detector 54 detects a difference between a tap coefficient of a FIR filter $40_-$ generating a crosstalk component of the adjacent track $T_-$ relative to the main track $T_0$ and a tap coefficient of a FIR filter $50_0$ generating a crosstalk component of the main track $T_0$ relative to the track $T_+$. A reproduction signal of the track $T_+$ and an output signal of the FIR filter $50_0$ are supplied to a combining circuit 51, and an output signal of the combining circuit 51 is supplied to an equalizer 52. An output signal of the equalizer 52 is supplied to a comparator 53 and is compared with a reference level. A tap coefficient of the FIR filter $50_0$ is controlled depending on an output from the comparator 53.

As above, the tap coefficients of the FIR filters are obtained in relation to two tracks. The tap coefficients of adjacent tracks on the same side have the same distribution. A difference between the positions (a difference between the positions B and C in FIG. 15) corresponds to one round of the track. Therefore, the tap coefficient of the FIR filter $40_-$ and the tap coefficient of the FIR filter $50_0$ are supplied to the position correlation detector 54, and each delay amount of the delay circuits $45_0$ and $45_-$ is controlled by an output signal of the position correlation detector 54.

The position correlation detector 54 calculates a difference between the sum total of absolute values of the tap coefficients of the FIR filter $40_-$ and the sum total of absolute values of the tap coefficients of the FIR filter $50_0$ as an example. Each delay amount (delay amount D) of the delay circuits $45_0$ and $45_-$ is controlled such that this difference becomes a predetermined value corresponding to one round of the track.

In addition, in the above-described signal processing unit, although not shown, a binarization detector is provided on the output side of the equalizer 42. The equalizer 42 performs a PR adaptive equalization process on a reproduction signal. In other words, the reproduction signal is equalized to be approximated to a targeted PR waveform. The binarization detector is, for example, a Viterbi decoder, and may obtain binarized data by performing a maximum likelihood decoding process on the equalization signal which is PR-equalized. The binarized data is supplied to the encoding/decoding unit 7 shown in FIG. 1 such that a reproduction data demodulation process is performed.

In addition, a PR convolution unit is connected to the binarization detector, and the PR convolution unit performs a convolution process on the binarized result to generate a target signal. The target signal is obtained by convolving the binarized detection result, and is thus an ideal signal without noise. The comparators 43 and 53 obtain an equalization error based on the equalization signal from the equalizer and the target signal, and use this equalization error to control a tap coefficient.

According to the present embodiment, it is possible to remove crosstalk components of adjacent tracks from a reproduction information signal with very high accuracy. For this reason, it is possible to realize considerable improvement in a reproduction performance, especially, during high density recording or narrow track pitch recording when deterioration due to crosstalk from adjacent tracks is intense.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A skew detection method including:

supplying reproduction signals, which are respectively reproduced approximately simultaneously from at least two tracks including a first adjacent track and a second adjacent track located on both sides of a main track, to first and second filters;

causing a combining unit to combine output signals of the first and second filters with a reproduction signal which is reproduced from the main track approximately simultaneously with the first adjacent track and the second adjacent track so as to cancel crosstalk;

causing a coefficient control unit to obtain an error with a target value of the output signal of the combining unit and control coefficients of the first and second filters so as to reduce the error; and detecting a skew of an optical disc from values of coefficients of predetermined taps of the first and second filters.

(2) The skew detection method according to (1), wherein the first and second filters are FIR filters, and a difference between the values of the coefficients is detected as a skew of the optical disc.

(3) The skew detection method according to any one of (1) and (2), wherein respective sums of tap coefficients of the first and second filters corresponding to ranges to a predetermined position are obtained using positions at which the main track and the first and second adjacent tracks are arranged in a track direction as a reference, and a difference between the sums of the coefficients is detected as a skew of the optical disc.

(4) The skew detection method according to any one of (1), (2), and (3), wherein the ranges are set from a simulation result.

(5) The skew detection method according to any one of (1), (2), (3) and (4), wherein the predetermined position is a position up to $\pm(\lambda/NA/2$ to $\lambda/NA)$.

(6) An optical disc device including:

a pickup that approximately simultaneously acquires reproduction signals respectively from a main track and at least two tracks including a first adjacent track and a second adjacent track located on both sides of the main track;

a first filter to which a first reproduction signal reproduced from the first adjacent track is supplied;

a second filter to which a second reproduction signal reproduced from the second adjacent track is supplied;

a combining unit that combines output signals of the first and second filters with a reproduction signal of the main track so as to cancel crosstalk;

a coefficient control unit that obtains an error with a target value of a output signal of the combining unit and controls coefficients of the first and second filters so as to reduce the error;

a skew detection unit that detects a skew of an optical disc from values of coefficients of predetermined taps of the first and second filters; and a skew correction unit that corrects the detected skew.

<2. Modified Examples>

Although the embodiment has been described as above, various modified examples are possible. For example, reproduction information signals of two tracks which are adjacent to an inner circumferential side and outer circumferential side of the main track may be obtained using a memory. In addition, reproduction signals of two tracks adjacent to an inner circumferential side and an outer circumferential side of a target track are used as reproduction signals of tracks adjacent relative to the main track. However, reproduction signals of four tracks may also be used.

In the above embodiment, the disc drive device for the optical disc is given as an example; however, the embodiment of the present disclosure may be applied even to an optical recording medium other than the disc, or to a recording and reproduction device or a data detection device for a magnetic recording medium of the disc-shaped or other types. In other words, the embodiment of the present disclosure is effective even in a case where tracks are formed to be arranged in a recording medium and crosstalk from adjacent tracks occurs.

The present disclosure contains subject matter related to that disclosed in Japanese Priority Patent Application JP 2012-195734 filed in the Japan Patent Office on Sep. 6, 2012, the entire content of which is hereby incorporated by reference.

What is claimed is:

1. A skew detection method comprising:
in a signal processing device:
acquiring a main reproduction signal, a first reproduction signal and a second reproduction signal simultaneously from a main track, and a first adjacent track and a second adjacent track located on each side of the main track, respectively;
delaying the main reproduction signal based on main coefficients of a main filter associated with the main track and second coefficients of a second filter associated with the second adjacent track;
combining a first output signal of a first filter associated with the first adjacent track and second output signal of the second filter with the delayed main reproduction signal to generate an output signal without crosstalk;
determining an error based on comparison between the output signal with a predetermined target value;
controlling first coefficients of the first filter and the second coefficients of the second filter based on the determined error; and
detecting a skew of an optical disc from values of the first coefficients and the second coefficients.

2. The skew detection method according to claim 1, wherein the first filter and the second filter are FIR filters, and a difference between the values of the first coefficients and the second coefficients is the detected skew of the optical disc.

3. The skew detection method according to claim 1, wherein respective sums of the first coefficients and the second coefficients corresponding to ranges at a predetermined position are obtained for the main track, the first adjacent track and the second adjacent track arranged in a track direction as a reference, and a difference between the sums of the first coefficients and the second coefficients is the detected skew of the optical disc.

4. The skew detection method according to claim 3, wherein the ranges are set from a simulation result.

5. The skew detection method according to claim 3, wherein the predetermined position is a position up to $\pm(\lambda/$ Numerical Aperture $(NA)/2$ to $\lambda/NA)$.

6. An optical disc device comprising:
a pickup that simultaneously acquires a main reproduction signal, a first reproduction signal and a second reproduction signal from a main track, and a first adjacent track and a second adjacent track located on each side of the main track, respectively;
a first filter to which the first reproduction signal acquired from the first adjacent track is supplied;
a second filter to which the second reproduction signal acquired from the second adjacent track is supplied;
a delay circuit to delay the main reproduction signal based on main coefficients of a main filter associated with the main track and second coefficients of the second filter;
a first combining unit that combines a first output signal of the first filter and a second output signal of the second filter with the delayed main reproduction signal so as to cancel crosstalk;
a coefficient control unit that determines an error based on comparison between an output signal of the first combining unit with a predetermined target value and controls first coefficients of the first filter and the second coefficients of the second filter based on the determined error;
a skew detection unit that detects a skew of an optical disc from values of the first coefficients and the second coefficients; and
a skew correction unit that corrects the detected skew.

* * * * *